United States Patent [19]

Kelley

[11] Patent Number: 5,099,412
[45] Date of Patent: Mar. 24, 1992

[54] AUTOMATIC CONTROL OF A DISCRETE SYSTEM WITH REDUNDANCY MANAGEMENT AND PRIORITIZED CONFLICT RESOLUTION

[75] Inventor: Gerald B. Kelley, Phoenix, Ariz.

[73] Assignee: Honeywell, Inc, Minneapolis, Minn.

[21] Appl. No.: 414,534

[22] Filed: Sep. 29, 1989

[51] Int. Cl.$^5$ .................. G06F 15/46; G05B 13/02
[52] U.S. Cl. ................................. 364/148; 364/184
[58] Field of Search ............... 364/148, 152, 156, 401, 364/402, 468, 184–187, 194, 581; 371/11.1–11.3, 8.1, 9.1

[56] References Cited

U.S. PATENT DOCUMENTS

| | | | |
|---|---|---|---|
| 4,479,241 | 10/1984 | Buckley | 364/513 X |
| 4,495,559 | 1/1985 | Gelatt, Jr. et al. | 364/148 |
| 4,740,887 | 4/1988 | Rutenberg | 364/184 |
| 4,774,677 | 9/1988 | Buckley | 364/513 |
| 4,807,108 | 2/1989 | Ben-Arieh et al. | 364/148 |

OTHER PUBLICATIONS

Williams, Ronald, An Operator System for a Fault-Tolerant Multiprocessor Controller, 8/88, pp. 18–29.
Ornedo, Renato, Design & Experimental Evaluation of an Automatically Reconfigurable Controller for Process Plants, pp. 1662–1668.

Primary Examiner—Joseph Ruggiero
Attorney, Agent, or Firm—Laurence J. Marhoefer; Donald J. Lenkszus

[57] ABSTRACT

A computer control system in which each input condition to which the system must respond is defined and a priority value assigned thereto. Desired system resource conditions called attributes herein corresponding to each input are determined. System resource states or attributes for all combinations of control element states are determined. An optimum configuration for the discrete control elements is established for a set of input conditions by comparing the system resource condition for each control element configuration with the system resource condition desired for all the input conditions. A score for each input condition is determined based on the priority of the input condition and the number of resource conditions for the input condition which match the resource conditions for a control elements configuration, and the optimum control configuration is the configuration which produces the highest cumulative score for all input conditions.

4 Claims, 1 Drawing Sheet

AUTOMATIC CONTROL OF A DISCRETE SYSTEM WITH REDUNDANCY MANAGEMENT AND PRIORITIZED CONFLICT RESOLUTION

BACKGROUND OF THE INVENTION

1. Field of the Invention

This invention relates to a method of automatically controlling a discrete system, and more particularly to a computer control method which provides redundancy management and degraded operating modes in the presence of faulty system components and system conditions while resolving conflicting operational requirements according to a defined priority schedule. A discrete system as used herein is a system in which the control elements are set to two or more discrete states, such as a two position on/off valve.

In certain applications, such as automating a flight engineer's function of controlling the pneumatics/air conditioning system of an aircraft, the primary problem is one of managing system resources to provide the best possible level of system performance for existing conditions. To do this, an automated system controller must select a configuration of controllable components which handles current internal and external conditions. Conflicting requirements must be resolved according to defined priorities for handling the various conditions present. In systems which possess redundant resources, degraded levels of performance should be provided until all redundancy is exhausted in the presence of multiple faults and/or abnormal conditions. Control of the system involves an element of overall system supervision which requires planning and anticipation of the total system response to reconfiguration actions in order to avoid oscillatory control or thrashing. The control outcome must be deterministic, and the implementation should be capable of efficient implementation in terms of computer size and time of execution.

2. Description of the Prior Art

Automated solutions to control problems of similar nature are normally attempted using one of two techniques. One conventional technique is to work out in advance explicit responses for all possible input conditions and program them into the logic or data tables. Another technique is to use artificial intelligence/expert systems or knowledge based systems.

There are a number of problems and disadvantages associated with these techniques. For conventional techniques, the number of possible combinations becomes excessively large as the number of inputs conditions and/or control elements increases. The embodiment of explicit responses may require excessive memory or search time. It may not be possible to test all possible cases. In addition, hard coded logic is very inflexible and may require complete reprogramming when system requirements are modified.

For artificial intelligence techniques, responses may be non-deterministic or difficult to predict in advance, making the system uncertifiable for airborne applications. It is usually impossible to test all possible responses. Special language and/or processors may be required. Excessive execution time and/or memory may be required because rules or requirements are expressed in "if . . . then . . ." form.

SUMMARY OF THE INVENTION

Objects of this invention include a system which:

accommodates a large number of possible input conditions;

resolves conflicting control requirements using limited system resources according to a priority schedule;

provides degraded levels of performance in the presence of failures and external conditions until all redundancy is exhausted;

takes into account all pertinent conditions at once and thereby avoids improperly responding to local conditions which might result in oscillatory control or thrashing.

Briefly, this invention contemplates the provision of a computer control system in which each input condition to which the system must respond is defined and a priority value assigned thereto. Desired system resource conditions called attributes herein corresponding to each input are determined. System resource states or attributes for all combinations of control element states are determined. An optimum configuration for the discrete control elements is established for a set of input conditions by comparing the system resource condition for each control element configuration with the system resource condition desired for all the input conditions. A score for each input condition is determined based on the priority of the input condition and the number of resource conditions for the input condition which match the resource conditions for a control elements configuration, and the optimum control configuration is the configuration which produces the highest cumulative score for all input conditions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION EMBODIMENT OF THE INVENTION

Figure 1:
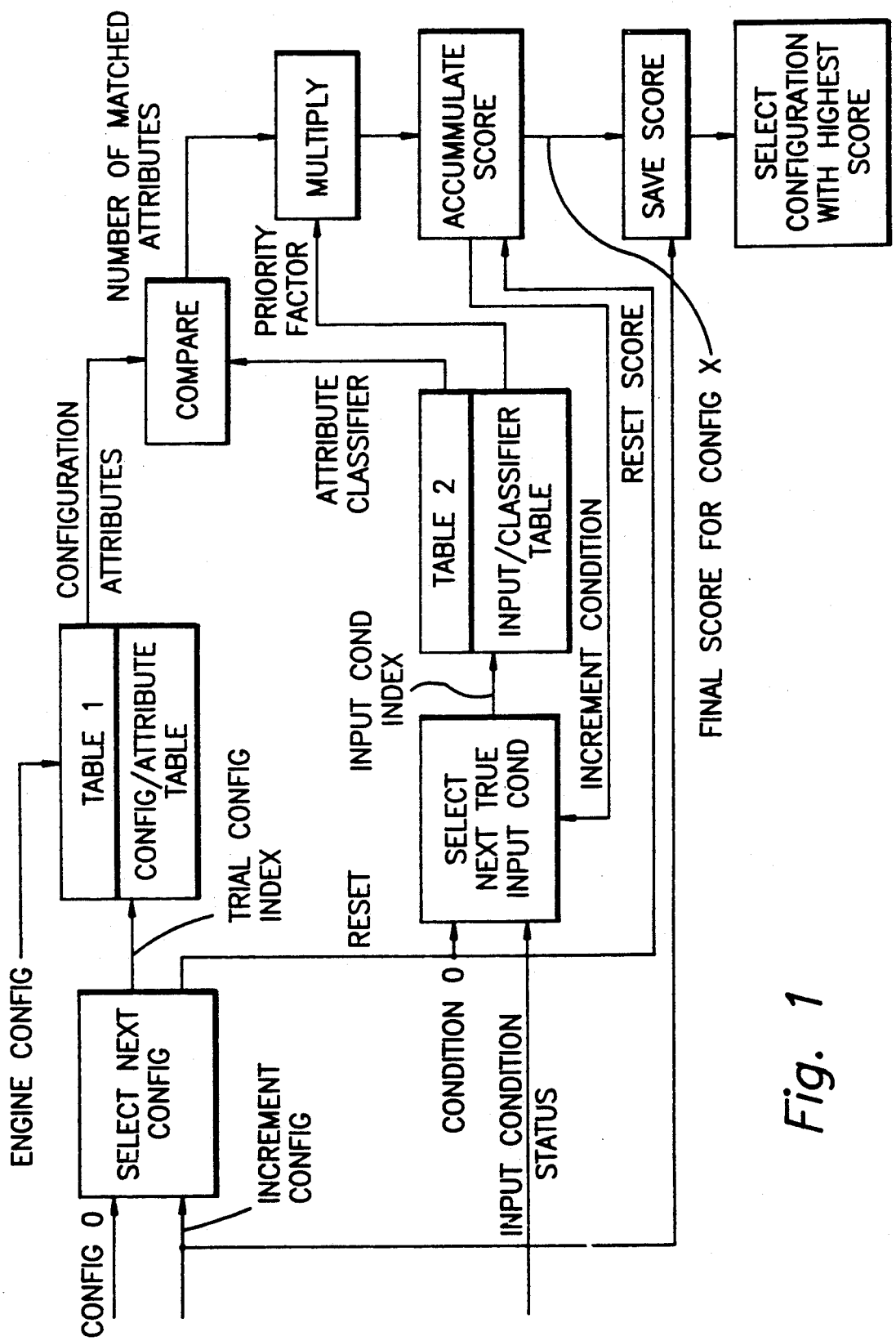
FIG. 1 is a flow diagram of one embodiment of the system of this invention.

This invention deals with a method of selecting a system configuration. A specific embodiment herein described relates to an aircraft pneumatic system which is configured by the positioning of on/off control valves. However, the method described can be applied to other types of discrete control systems.

In the aircraft pneumatic system, a very limited number of valve configurations are possible. A computer in accordance with the invention examines all possible configurations to find the one which best meets system conditions and requirements according to a priority schedule. This is accomplished by computing a figure of merit or score for each of the configurations and selecting the configuration with the highest score.

The configuration scores are computed utilizing two tables stored in a computer; a Configuration Attribute Table and an Input Classifier Table.

Configuration Attribute Table

This table relates each possible system configuration to a set of important system resource characteristics or attributes. These are the characteristics or attributes which are used to determine if a configuration is desirable under current operating conditions. The general layout of this table is shown below.

| CONFIGURATION ATTRIBUTE TABLE | | | | | | | |
|---|---|---|---|---|---|---|---|
| | Attributes (System Resource Characteristics) | | | | | | |
| Configuration | A1 | A2 | A3 | A4 | A5 | ... | Ak |
| 0 | 1 | 0 | 0 | 1 | 0 | ... | 0 |
| 1 | 0 | 1 | 0 | 0 | 1 | ... | 0 |
| 2 | 0 | 0 | 1 | 1 | 0 | ... | 1 |
| 3 | 1 | 0 | 0 | 0 | 1 | ... | 1 |
| 4 | 0 | 0 | 0 | 1 | 0 | ... | 0 |
| . | . | . | . | . | . | ... | . |
| . | . | . | . | . | . | ... | . |
| n | 1 | 1 | 1 | 0 | 0 | ... | 1 |

For example, in a aircraft pneumatics system, one of these attributes (e.g. "A1") is the state of pressurization in a manifold. The Configuration Attribute Table tells whether or not a given manifold is pressurized (e.g. "1") or unpressurized (e.g. "0") for each configuration (O-N) of control values. For some operating conditions, the manifold should be pressurized; for others it should not. The manifold pressurized attribute is used to help determine if a configuration would be desirable under a given set of operating conditions.

Input Classifier Table

The Input Classifier Table relates system input conditions and requirements to the same set of system attributes defined in the configuration table. System conditions and requirements are represented by a set of inputs which define the rows in the Input Classifier Table. Each entry in the classifier table defines which attributes are desired to be present or absent if the input condition is true. Examples of input conditions include manifold failure, engine failure, system temperature high, etc. Those attributes which are not important for that input are not specified; that is, they are "don't cares." Each condition or requirement in the classifier table has a priority weighting factor assigned to it. Input conditions and requirements are arranged in order of decreasing priority in the table. Conditions which are of equal priority are divided into groups. A priority factor is assigned to the group in a way which will guarantee that the higher priority conditions will be handled in preference to any lower priority condition or combination thereof.

The general form for the classifier table is shown below.

| CLASSIFIER TABLE | | | | | | | | | |
|---|---|---|---|---|---|---|---|---|---|
| Input | Attributes | | | | | | | Priority | |
| Condition | A1 | A2 | A3 | A4 | A5 | ... | Ak | No. | Factor |
| C00 | x | x | 1 | x | x | ... | x | 1 | 123456 |
| C01 | x | 0 | 0 | x | x | ... | x | 1 | 123456 |
| C02 | 1 | x | x | x | x | ... | 0 | 1 | 123456 |
| . | . | . | . | . | . | ... | . | . | . |
| C0m0 | 1 | 1 | 1 | x | x | ... | x | 1 | 123456 |
| C10 | 1 | x | 1 | x | x | ... | x | 2 | 23456 |
| C11 | x | 0 | 0 | x | x | ... | x | 2 | 23456 |
| C12 | 0 | x | x | x | x | ... | 0 | 2 | 23456 |
| . | . | . | . | . | . | ... | . | . | . |
| C1m1 | 1 | 0 | 1 | x | x | ... | x | 2 | 23456 |
| C20 | x | 0 | 1 | x | x | ... | x | 3 | 3456 |
| C21 | x | 0 | 0 | x | x | ... | x | 3 | 3456 |
| C22 | 0 | x | x | x | x | ... | 1 | 3 | 3456 |
| . | . | . | . | . | . | ... | . | . | . |
| C2m2 | 0 | 0 | 0 | x | x | ... | x | 3 | 3456 |
| . | . | . | . | . | . | ... | . | . | . |
| Cq0 | x | x | 1 | x | 1 | ... | x | q+1 | 1 |
| Cq1 | x | 1 | 0 | x | x | ... | x | q+1 | 1 |
| Cq2 | x | x | x | 0 | x | ... | 0 | q+1 | 1 |
| . | . | . | . | . | . | ... | . | . | . |
| Cqmq | x | 0 | 1 | x | x | ... | x | q+1 | 1 |

As previously discussed, a score is computed for each possible configuration in order to select the best configuration. The procedure to compute the score is as follows:

Each configuration 0-n is evaluated. A score for each configuration is developed by comparing the configuration attributes against the attributes desired for the system input conditions.

FIG. 1 is a flow chart of the operation. Configuration 0 is first selected. The row from the configuration table for this first configuration is compared against each row of the classifier table corresponding to a true input. The number of attributes from the two rows which match is multiplied by the priority factor from the classifier table to compute the partial score from the first configuration input in the classifier table. The sum of all partial scores gives the score for the configuration. This process is repeated for each of the configurations in the selected sub-table, resulting in a matrix of scores for each configuration.

The following chart shows an example of how the score would be computed for configuration y assuming that inputs 1 through k are true.

| SCORE COMPUTATION EXAMPLE | | | | | | | | | |
|---|---|---|---|---|---|---|---|---|---|
| | A1 | A2 | A3 | A4 | ... | An | PRIORITY FACTOR | | PARTIAL SCORE |
| config y | 1 | 0 | 0 | 1 | ... | 1 | | | |
| input 1 | x | x | 1 | 1 | ... | x | 123456 | 1 x | 123456 |
| input 2 | 1 | 0 | x | x | ... | x | 23123 | 2 x | 23123 |
| input 3 | x | 1 | x | x | ... | x | 200 | 0 x | 200 |
| . | . | . | . | . | ... | . | . | . | . |
| input k | x | x | 0 | x | ... | x | 2 | 1 x | 2 |

| SCORE COMPUTATION EXAMPLE | | | | | | | |
|---|---|---|---|---|---|---|---|
| A1 | A2 | A3 | A4 | ... | An | PRIORITY FACTOR | PARTIAL SCORE |
| CONFIGURATION y TOTAL SCORE | | | | | | | |

Once the scores are computed for each configuration, then the best attainable configuration can be simply selected. The configuration with the highest score is the most desirable. However, it is possible that a control fault could prevent its implementation. To account for this, the desired configuration may be checked against the current status for the control components. In an aircraft pneumatic system, this would be the status of the pneumatic control valves. If any control component is failed in a state other than the desired state, then the configuration is not attainable and the configuration with the next highest score should be selected. If control faults would again prevent the realization of the configuration, the next best must be selected until one is found which is attainable. In the worst case, the current configuration would of course be the last option and would be attainable by definition.

No lower priority condition or combination of lower priority conditions should be handled in preference to a higher priority condition. Priority factors can be calculated to guarantee this in the following manner.

The following factors can be used to establish classifier table priorities.

Condition Priority—this is the relative priority number of each input condition and is taken from the system requirements.

Relevant Attributes—this gives the maximum possible matches in each row of the table. It corresponds to the number of attributes which must be matched in order to handle the corresponding input.

Maximum Attributes—this is the maximum possible simultaneous matches for the priority group. This number need only establish an upper bound for the number of matches in the group and is always guaranteed to be less than or equal to the sum of the relevant attributes column for the group. In some cases, the maximum attributes can be set lower than this guaranteed maximum because system characteristics will prevent all attributes from matching simultaneously.

Priority Factor—this is the multiplier for the number of attribute matches for corresponding input.

Each Priority Factor is derived from the priority factors of the lower priority inputs per the formula below:

Priority Factor(n) = cumulative score(n−1)+1

Maximum Score—this is the maximum score possible for the entire priority group. It is naturally determined from the product of the maximum number of attributes which could ever be simultaneously matched in the group and the group priority factor.

maximum score(n) = max attributes(n) × Priority Factor(n)

Cumulative Score—this is the score for a configuration which matches the maximum possible simultaneous attributes for all input from this and all lower priority groups. Note that such a configuration may not even exist; it establishes an upper bound on the score.

cumulative score(n) = cumulative score(n+1) + maximum score (n)

Since each priority factor is set at 1 greater than the cumulative score for the previous priority group, no combination of lower priority inputs could ever override an input at the current level. By inspection, we can see that the formula for the priority factor can be reduced as shown below. It can be expressed as the product of the maximum attributes limit and priority factor of the next lower priority group and is actually a function of the maximum attributes limits of all lower priority groups.

$$\begin{aligned}\text{priority factor}(n) &= [\text{max attributes}(n-1)+1] \\ &\quad X[\text{priority factor}(n-1)] \\ &= \text{product } i = n-1 \text{ to } k \text{ of} \\ &\quad [\text{max attributes}(i)+1]\end{aligned}$$

where k is the number of priority groups.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for controlling a system comprised of a plurality of control elements respectively switchable between discrete states in response to a plurality of input conditions, said control elements respectively controlling a state of a plurality of resource elements, comprising the steps:
   a) storing data that identifies the state of each of said plurality of resource elements for a plurality of control element state combinations;
   b) storing data that identifies a desired state of each of said resource elements for each of said plurality of input conditions;
   c) storing data assigning a priority to each of said plurality of input conditions;
   d) fetching said stored data that identifies the state of said plurality of resource elements for one control element state combination;
   e) fetching said stored data that identifies a desired resource element state for each of said resource elements for one of said input conditions;
   f) comparing said fetched stored data in steps d and e, and determining the number of said desired resource element states that result from said one control element combination;
   g) establishing a partial score for said one control element combination that is a function of said number of desired resource element states and the priority assigned to said one of said input conditions;
   h) repeating steps e, f and g for a plurality of input conditions;

i) establishing a score for said one control element state combination from said partial scores established in step h;

j) repeating steps d through h for additional configurations of control element states; and k) selecting a control element state combination on the basis of said score.

2. A method for controlling a system comprised of a plurality of control elements respectively switchable between discrete states in response to a plurality of input conditions, said control elements respectively controlling a state of a plurality of resource elements, comprising the steps:

a) storing data that identifies the state of each of said plurality of resource elements for a plurality of control element state combinations;

b) storing data that identifies a desired state of each of said resource elements for each of said plurality of input conditions;

c) storing data assigning a priority to each of said plurality of input conditions whereby said priority is calculated so that the addition of new input conditions will never result in a decrease in the total number of desired system resource states realized for all input conditions with a higher priority;

d) fetching said stored data that identifies the state of said plurality of resource elements for one control element state combination;

e) fetching said stored data that identifies a desired resource element state for each of said resource elements for one of said input conditions;

f) comparing said fetching stored data in steps d and e, and determining the number of said desired resource element states that result from said one control element combination;

g) establishing a partial score for said one control element combination that is a function of said number of desired resource element states and the priority assigned to said one of said input conditions;

h) repeating steps e, f and g for a plurality of input conditions;

i) establishing a score for said one control element state combination from said partial scores established in step h;

j) repeating steps d through h for additional configurations of control element states; and k) selecting a control element state combination on the basis of said score.

3. The method as in claim 1 further comprising the steps:

l) determining if the configuration selected in step k is achievable; and m) selecting the configuration with the next highest score if the configuration selected in step k is not achievable.

4. The method as in claim 2 further comprising the steps:

l) determining if the configuration selected in step k is achievable; and m) selecting the configuration with the next highest score if the configuration selected in step k is not achievable.

* * * * *